(12) United States Patent
Ribaric et al.

(10) Patent No.: US 12,135,009 B2
(45) Date of Patent: Nov. 5, 2024

(54) METHOD FOR ESTIMATING REMAINING USEFUL LIFE OF COMPONENTS OF AN OPERATIONAL WIND TURBINE

(71) Applicants: ACCIONA GENERACIÓN RENOVABLE, S.A., Navarra (ES); SENTIENT SCIENCE CORPORATION, Buffalo, NY (US)

(72) Inventors: Adrijan Ribaric, Buffalo, NY (US); Juan Gallego-Calderon, Buffalon, NY (US); Mercedes Irujo Espinosa De Monteros, Navarra (ES)

(73) Assignees: ACCIONA GENERACIÓN RENOVABLE, S.A., Navarra (ES); SENTIENT SCIENCE CORPORATION, Buffalo, NY (US)

( * ) Notice: Subject to any disclaimer, the term of this patent is extended or adjusted under 35 U.S.C. 154(b) by 461 days.

(21) Appl. No.: 17/600,436

(22) PCT Filed: Apr. 1, 2019

(86) PCT No.: PCT/EP2019/058207
§ 371 (c)(1),
(2) Date: Sep. 30, 2021

(87) PCT Pub. No.: WO2020/200421
PCT Pub. Date: Oct. 8, 2020

(65) Prior Publication Data
US 2022/0178353 A1  Jun. 9, 2022

(51) Int. Cl.
*F03D 17/00* (2016.01)
*F03D 7/02* (2006.01)

(52) U.S. Cl.
CPC ........... *F03D 17/00* (2016.05); *F03D 7/0292* (2013.01); *F05B 2260/84* (2013.01); *F05B 2270/332* (2013.01)

(58) Field of Classification Search
CPC ...... F03D 1/0675; F03D 17/00; F03D 7/0224; F03D 13/20; F03D 9/25; F03D 13/10;
(Continued)

(56) References Cited

U.S. PATENT DOCUMENTS

| 2014/0088887 A1 | 3/2014 | Poon et al. |
| 2014/0088888 A1* | 3/2014 | Poon ........................ F03D 80/50 702/34 |

(Continued)

FOREIGN PATENT DOCUMENTS

| CN | 113614359 A | * 11/2021 | ............. F03D 17/00 |
| CN | 115659738 A | * 1/2023 | |

(Continued)

*Primary Examiner* — Andre J Allen
(74) *Attorney, Agent, or Firm* — Hayes Soloway PC

(57) ABSTRACT

A method and a system for estimating remaining components life of an operational wind turbine from actual wind turbine operation conditions after it was commissioned, using a data acquisition module configured to measure real historical data of said operational wind turbine, and an additional state detection unit configured to identify historical states of operation. The method comprises extracting historical data from the data acquisition module at time intervals, identify operational states of the wind turbine, validate the identified operational states and identify uncertain data that do not match. Next, simulate a turbine model for each operational state identified and wind condition thereof at each time interval, and calculate a fatigue equivalent load for each operational state and wind condition.

12 Claims, 3 Drawing Sheets

(58) Field of Classification Search
CPC .......... F03D 80/70; F03D 80/00; F03D 80/50; F03D 15/00; F03D 1/0658; F03D 7/0204; F03D 13/25; F03D 7/042; F03D 13/40; F03D 1/0633; F03D 80/30; F03D 7/048; F03D 9/255; F03D 7/0296; F03D 13/22; F03D 15/10; F03D 80/60; F03D 3/005; F03D 7/0276; F03D 7/0284; F03D 80/40; F03D 1/0641; F03D 1/065; F03D 7/028; F03D 7/0264; F03D 7/043; F03D 7/0272; F03D 3/061; F03D 80/88; F03D 1/06; F03D 3/062; F03D 1/04; F03D 7/047; F03D 7/02; F03D 9/257; F03D 80/80; F03D 7/00; F03D 7/04; F03D 3/02; F03D 80/82; F03D 9/11; F03D 7/046; F03D 15/20; F03D 7/024; F03D 7/06; F03D 1/00; F03D 1/0691; F03D 7/0292; F03D 7/0268; F03D 7/045; F03D 1/0608; F03D 7/0244; F03D 1/02; F03D 7/0232; F03D 7/022; F03D 80/85; F03D 7/0248; F03D 3/068; F03D 9/28; F03D 7/026; F03D 3/064; F03D 3/067; F03D 3/0427; F03D 7/0236; F03D 9/007; F03D 9/00; F03D 3/002; F03D 3/06; F03D 3/04; F03D 7/044; F03D 80/55; F03D 1/025; F03D 3/0409; F03D 7/0256; F03D 9/32; F03D 9/17; F03D 80/10; F03D 7/0212; F03D 7/0252; F03D 7/0228; F03D 7/0288; F03D 9/34; F03D 13/35; F03D 1/0625; F03D 13/00; F03D 13/30; F03D 3/00; F03D 9/10; F03D 5/00; F03D 3/0418; F03D 9/12; F03D 3/0472; F03D 9/22; F03D 9/19; F03D 9/30; F03D 3/0454; F03D 7/0208; F03D 3/0463; F03D 9/18; F03D 7/041; F03D 3/0436; F03D 3/0445; F03D 9/35; F03D 5/06; F03D 9/008; F03D 15/05; F03D 5/02; F03D 3/049; F03D 9/14; F03D 3/0481; F03D 80/20; F03D 5/04; F03D 7/0216; F03D 9/43; F03D 9/46; F03D 9/20; F03D 9/45; F03D 3/007; F03D 9/37; F03D 13/256; F03D 1/0677; F03D 5/005; F03D 1/0601; F03D 7/0298; F03D 80/301; F03D 9/48; F03D 13/126; F03D 80/703; F03D 13/139; F03D 13/201; F03D 17/011; F03D 17/029; F03D 1/06495; F03D 1/0681; F03D 17/028; F03D 7/0302; F03D 7/049; F03D 80/881; F03D 13/206; F03D 17/0065; F03D 17/034; F03D 80/502; F03D 13/112; F03D 9/16; F03D 13/104; F03D 80/709; F03D 1/0688; F03D 15/15; F03D 80/003; F03D 80/401; F03D 1/0685; F03D 1/069; F03D 13/122; F03D 17/003; F03D 17/013; F03D 3/011; F03D 7/0202; F03D 9/41; F03D 13/135; F03D 17/006; F03D 17/015; F03D 13/205; F03D 17/014; F03D 17/021; F03D 17/022; F03D 3/009; F03D 80/601; F03D 80/821; F03D 9/13; F03D 9/39; F03D 1/0679; F03D 17/025; F03D 3/066; F03D 7/065; F03D 1/0682; F03D 13/2005; F03D 17/002; F03D 17/005; F03D 1/0643; F03D 1/0664; F03D 1/165; F03D 13/401; F03D 1/0684; F03D 80/501; F03D 1/0687; F03D 1/125; F03D 1/141; F03D 13/116; F03D 17/012; F03D 1/0648; F03D 1/181; F03D 15/205; F03D 17/017; F03D 17/027; F03D 80/701; F03D 1/101; F03D 13/204; F03D 13/402; F03D 17/016; F03D 17/018; F03D 17/024; F03D 17/0285; F03D 80/005; F03D 80/403; F03D 1/0606; F03D 1/0645; F03D 1/0649; F03D 1/0671; F03D 13/403; F03D 15/101; F03D 17/004; F03D 17/007; F03D 17/026; F03D 17/036; F03D 3/063; F03D 80/001; F03D 80/402; F03D 80/405; F03D 80/602; F03D 80/707; F03D 1/044; F03D 15/207; F03D 17/008; F03D 80/002; F03D 80/509

See application file for complete search history.

(56) References Cited

U.S. PATENT DOCUMENTS

| | | | |
|---|---|---|---|
| 2016/0010628 | A1 | 1/2016 | Dhar et al. |
| 2018/0142674 | A1 | 5/2018 | Hammerum et al. |

FOREIGN PATENT DOCUMENTS

| | | | | |
|---|---|---|---|---|
| CN | 115700573 | A | * | 2/2023 |
| CN | 116070368 | A | * | 5/2023 |
| CN | 117077532 | A | * | 11/2023 |
| CN | 117291113 | A | * | 12/2023 |
| EP | 2290597 | B1 | | 5/2016 |
| KR | 101706508 | B1 | | 2/2017 |

* cited by examiner

METHOD FOR ESTIMATING REMAINING USEFUL LIFE OF COMPONENTS OF AN OPERATIONAL WIND TURBINE

CROSS-REFERENCE TO RELATED APPLICATIONS AND PRIORITY

This patent application claims priority from PCT Application No. PCT/EP2019/058207 filed Apr. 1, 2019. This patent application is herein incorporated by reference in its entirety.

OBJECT OF THE INVENTION

The present invention belongs to the field of health assessment and prognostic for wind turbines and allows for the estimation of remaining useful life of wind turbine components. In particular, it relates to a method for modeling and simulating wind turbine actual loads after the turbine has been commissioned (post-design). The invention provides a very good understanding of the actual occurring forces and moments on blades, main shaft, tower, and other components. This invention describes a method to identify and distinguish operational conditions and their respective fatigue loads over the history of a turbine. The fatigue loads can then be used to determine the reliability of individual components as well as the overall turbine.

BACKGROUND OF THE INVENTION

Wind turbine components are designed to have a useful service life of about twenty to twenty-five years. Fluctuations in environmental factors cause variations in loading pattern leading to premature component failure. These premature failures lead to unplanned service which is often a major portion of the operational cost to the wind turbine farm operator.

Unplanned servicing schedules and repairs reduce the productivity and increase the maintenance costs. Maintenance costs for the wind turbines increase as time progresses. Some methods for estimating component life are known in the art.

The IEC 61400-1 (Design requirements) is today's conventional standard to estimate driven loads on turbines. The main purpose of the IEC standard is certifying turbines for 20 years life. The Remaining Useful Life RUL is estimated with a wind characterization of the site through SCADA or met mast measurements or simulation wind models (as described in the UL 4143 standard or DNVGL-ST-0262 Life Time Extension LTE Standards already approved and IEC 61400-28 LTE Standard in progress of definition). In those cases, a wind tendency is characterized and life is calculated based on this wind tendency estimation at a wind farm level. These wind tendencies are not the actual wind conditions and operational conditions of a particular wind turbine, and are not an accurate and precise estimation of the actual loads that have occurred and hence the actual damage and future loads estimation.

For example, document US2016/0010628 discloses a method, comprising receiving installation data, operation data, environment data and historical data of a wind turbine. A plurality of correction values corresponding to the plurality of damage values are determined based on the operation data and the historical data. The plurality of correction values includes corrections due to sporadic failure modes and corrections to the progression of persistent failure modes determined based on the data obtained during maintenance schedule. This document discloses a probabilistic method comparing damage values and models comparing the installation data, historical data and updated operational data and predict persistent failure modes or sporadic failure modes. The actual wind loads occurring in the wind turbine from the date of commission are not modeled and an accurate model of actual damage due to shear and bending moments to each component is not explicitly considered.

The document EP 2290597 discloses a method comprising a performance simulator which uses site condition of a wind farm, turbine configuration design data and historical field data to simulate the performance of the wind turbine. However, it does not consider the states of operation of the particular wind turbine, and how many changes of states of operation and hours of operation in each state the turbine have endured in each particular state. This is essential to categorize the wind turbine historical operational condition and corresponding loads and important to accurately estimate remaining life of components. Additionally, the method disclosed to collect the data is not accurate enough, and much inaccurate and erroneous data will be taken in the simulation process leading to errors in the damage and life estimation.

DESCRIPTION OF THE INVENTION

A method for estimating remaining components life of a wind turbine is disclosed herein with which it has been found that at least the above disadvantages relating to the prior art solutions are mitigated. The method provides accurate quantification of damage for every component from the day of commission. It accurately estimates the remaining life for each component of a particular operational wind turbine, with its own real conditions of operation comprising its unique location (i.e. wind resource and turbulence intensity and design configuration).

More in particular, according to a first aspect of the invention, this invention describes a method for estimating remaining useful life of components of an wind turbine model executed by computational elements, wherein said computational elements are communicatively coupled to the operational wind turbine which comprises a data acquisition module configured to measure real historical data of said operational wind turbine and an additional state detection unit to identify historical states of operation, wherein said method comprises:

- extracting historical data from the data acquisition module at a chosen time interval, said data comprising at least wind speed, blade pitch position and rotor speed;
- identifying operational states of the wind turbine by means of the state detection unit for each chosen time interval, said operational states comprising at least Run, Idle and Transition;
- validating the identified operational states with the data extracted from the data acquisition module at each time interval and identify uncertain data that do not match;
- identifying a prevailing operational state comprising the state at which the longest amount of time said wind turbine has spent thereof;
- identifying wind condition, said wind condition comprising at least mean wind speed and turbulence intensity at the chosen time interval;
- Obtaining actual occurring loads for the wind turbine model corresponding to wind condition, at least prevailing state and duration thereof based on a simulation model.

Preferably, the method further comprises a step for identifying a number of transitory events comprising the number of times the wind turbine has changed states and a step of obtaining actual occurring loads for at least one of the transitory events at each time interval and wind condition thereof based on a simulation model. Preferably, all transitory events are taking into account for a very accurate estimation of all fatigue loads during transitional events that each component of the wind turbine have suffered.

Transitory events can represent short times during a time interval, but can have a great effect on loading and fatigue damage. Hence one of the advantages of this invention is to accurately detect these transitory events and simulate the actual loading for a particular operational wind turbine model and its particular wind condition variation.

Preferably, the Transition operational state is subcategorized in three further states of operation: Start up, Normal Stop and Emergency Stop. However, the invention is not restricted to these operation states only. More refined subcategorization can be used as well, e.g. different types of emergency stops. However, the invention suggests using the mentioned operational states as a minimum.

As it was mentioned, the state identification unit can be accomplished by combining information from the state detector unit with operational metrics from the data acquisition module. This will prevent misleading state identification and allows for handling multiple state changes.

Preferably, the state detector unit is part of the wind turbine internal control system and is given as a logical variable for each state of operation.

Preferably, the data acquisition module further comprises generator power variation at each time interval.

Alternatively, the state detector unit could be a code executed by computational elements which identify states of operation from the data acquisition module. For example, the code can be an algorithm that by combining the data delivered by the independent sensors from the data acquisition unit e.g. blade pitch, generator power, rotor speed and wind velocity, can validate and identify the data which is uncertain, erroneous and/or does not correspond by recurrently comparing instantaneous data Preferably, wind turbine simulation can be an aeroelastic simulation, a dynamic multibody analysis, finite element simulation, an aeroservoelastic model, or any model that represents faithfully the wind turbine for obtaining reliable fatigue loads. The model of the particular wind turbine should be run in a design of experiment for each operation state. The model should be representative enough to capture the interactions between all the intervening parts of the turbine with the wind and/or any other excitation source as earth wake or sea waves. Those interactions can be inertial, elastic, aerodynamic forces that occur when the turbine is exposed excitation sources.

Preferably, in addition to the previous mentioned interactions, the control mechanism of the turbine should be taken into account. If an aeroelastic simulation is chosen, for example, the control mechanism should replicate the true control behavior of the particular turbine with enough accuracy, such that all relevant dynamic responses of the turbine are captured.

The design of experiments for each operation state should entail all relevant wind conditions. This invention is not restricted to any particular set of wind conditions, but it is suggested to use at least mean wind speed, turbulence intensity, vertical inflow direction (also referred to upflow), horizontal inflow direction (also referred to yaw error), wind shear, and air density. The units of all conditions need to be consistent. The mean wind speed is usually referring to the average wind speed at turbine hub height during a sample period, e.g. 10 min. Turbulence intensity can be calculated as the standard deviation of wind speed divided by the mean wind speed for the same sample period. Other methods to calculate the turbulence intensity are applicable too. Wind shear, also referred to as wind gradient, refers to the difference in mean wind speed in horizontal direction. The wind shear can be expressed using the power law equation. The exponent of the equation can be used as a value for the design of experiments. The aeroelastic model is simulated for each experiment. The duration of the simulation should be equal to the time interval (e.g. 10 min), plus any transitional time that the model requires to converge from its initial condition (e.g. at rest) to the operational state of the particular experiment should be excluded from the simulation, since it is not representative of the actual behavior of the turbine for a given experiment (wind condition).

Preferably, the method further entails a calculation of fatigue equivalent loads (also referred to as damage equivalent loads) for each operational state and wind condition. This is done by multiple turbine simulations at multiple time intervals to estimate a fatigue equivalent load at each operational state and each wind condition calculated for each time interval for at least one component in a specific position of the operational wind turbine.

These load values shall induce the same damage to the wind turbine components during a time interval (e.g. 10 min) as the original recorded time varying loads. This invention does not specify the methodology for calculating the fatigue equivalent load values. However, it is suggested to use Rain Flow Counting method for structural components and Load Revolution Distribution for all bearing and gear components. The loads are the results for each experiment. Once the turbine model is run for the complete design of experiment, the fatigue equivalent loads of each experiment are collected and correlated to their respective wind conditions.

Preferably, a further step is to model a hyper dimensional response model HDRM representation for each operational state, wind condition and one load type such as bending moments, torque, thrust forces, shear forces or fatigue equivalent load on a specific position of a determined component of the wind turbine. Preferably, the correlations should then be represented by a hyper-dimensional response surface model. A hyper-dimensional response surface model explores the relationship between several explanatory variables and one or more response variables. In this case the response surface model explores the fatigue equivalent loads to wind conditions. Various techniques exist to establish a response surface model based on a given set of executed experiment, such as Taylor Series, Radial Basis Function, and Kriging. This invention does not specify a technique to be used, but instead suggest that various techniques should be tested to identify the best representation for the correlation. The process of creating a response surface model should be repeated for all operational states (RUN, IDLE, TRANSITION) for the same or similar wind conditions. This is a useful way of developing a hyper surface response model for different turbine models, and a handy way of representing an estimation of fatigue equivalent loads for any wind speed and turbulence intensity for a particular state of operation. This could be done to estimate or correlate for another equivalent turbine of the same model in same wind farm or different wind farm. Note number of transitory events won't be the same depending on the wind resource, but the hyper dimensional response model for a fatigue damage to a particular component in a particular state of operation and wind condition for the same wind turbine model should be equivalent.

Which of the response surface models should be utilized depends on the operation state that was identified earlier on in the process for each time intervals.

Preferably, any of the previous steps could be used for a reliability analysis or remaining useful life for at least one component of the wind turbine using historical operation condition and fatigue equivalent loads.

The method can further comprise a time-series of loads that the turbine experienced from the date of commission until the present day. Note, this is executed by multiple turbine simulations at multiple time intervals from date of commission to estimate an historical time-series fatigue equivalent load for at least one component of the operational wind turbine accurately from the date of commission. This could be computational and time intensive, hence the hyper response surface model can be an alternative accurate and faster estimation for a given turbine model once it is calculated for an equivalent wind turbine model or more precisely for the particular wind turbine for which it was modelled.

Preferably the method also comprises a reliability analysis or remaining useful life model for each component of the wind turbine by means of the actual occurring loads from date of commission. More in particular, the load time-series can then be used for a reliability analysis such as a stress-cycle curves combined with a linear damage progression model or remaining useful life calculation (e.g. particle filter) for each wind turbine component such on blades, main shaft, bearings, tower, and other components.

The clear distinction of actual occurring loads and load duration for each turbine and state of operation changes allows for a more granular asset specific load analysis, evidencing a considerable increased accuracy in performance and life calculation. Using real operational data+ utilization of hyper surface models allows higher resolution compared to the assessments based on tendency wind condition estimation and certification operation condition wind turbine modeling Furthermore, understanding the true loads allows OEMs or third parties to provide better retro-fit designs to commissioned turbines, and provides operators a better failure risk assessment, if combined with proper load to life analyses such as the present invention models.

Accurate asset specific loads are a necessity for conducting new reliability analyses for already commissioned turbines, focusing on the long-term plan for asset actions, rather than the short-term traditional O&M.

Preferably, the approach measures wind and operation conditions in a time-series as an input. The time-series can have any time interval, but it works best to use a time interval of at least 10 min (1.67e-3 Hz) or smaller. Furthermore, preferably the input time-series should include statistical values for each time interval, such as mean, minimum, maximum, and standard deviation.

The source of the time-series is independent of this methodology, but preferably the input data can be taken from the Supervisory Control and Data Acquisition (SCADA) of the particular wind turbine and, if available, supplemented by a nearby meteorological tower to include wind conditions such as wind shear & veer, wind upflow, turbulence intensity, and air density.

Preferably, there are two variables of interest that should be identified that provide information about the state of the turbine during each 10-min data point. The first is the amount of times the turbine has changed state; examples are run to pause, then to ready and back to run, i.e. three state changes. The second is a code that indicates the longest amount of time the turbine spent on a given state. When there is continuous operation, this feature re-assures, along with the operational sensors, that the turbine is operating at a specific state. However, there could be multiple state changes within a time interval.

In addition to identifying whether the turbine is producing power or in idling condition, this invention seeks to identify data that is uncertain, i.e. conflicting information from state detection unit and SCADA, is marked or identified as "unidentified". Furthermore, lost or invalid values, such as "None", "Null", or physically impossible values, are labeled as "garbage."

Each data point will have an associated state (e.g. run, idle, garbage, unidentified) in the dataset. Furthermore, the sequential nature of on time of the states allows for the identification of stop events. The emergency stops are identified among the stops based on the state variable or in the operational information. The rest of identified stops are labeled as "normal stops." A transition from an "idle" to "run" state is labeled as a "start-up."

According to a second aspect of the invention, this invention describes a system for estimating remaining useful life of components of a wind turbine model, comprising at least said wind turbine model which comprises a data acquisition module configured to measure real historical data of said operational wind turbine, a state detection unit to identify historical states of operation, wherein said system comprises computational elements communicatively coupled thereof:

for extracting historical data from the data acquisition module at a chosen time interval, said data comprising at least wind speed, blade pitch position and rotor speed;

identifying operational states of the wind turbine by means of the state detection unit for each chosen time interval, said operational states comprising at least Run, Idle and Transition;

for validating the identified operational states with the data extracted from the data acquisition module at each time interval and identify uncertain data that do not match;

identifying a prevailing operational state comprising the state at which the longest amount of time said wind turbine has spent thereof;

for identifying wind condition, said wind condition comprising at least mean wind speed and turbulence intensity at the chosen time interval;

Obtaining actual occurring loads for the wind turbine model corresponding to wind condition, at least prevailing state and duration thereof based on a simulation model.

Preferably, the computational elements are able to performed any one of the steps of the method disclosed above in the first aspect of the invention.

According to a third aspect of the invention, this invention discloses a computer program adapted to performed the method and any one of the steps described above.

This method and implemented program adapted to performed said method, enables to perform accurate simulation of the real damage on each component of a particular wind turbine experiencing a determined particular wind conditions, transitions events and corresponding actual fatigue loads. Hence, accurate improved retrofit designs of components for a particular wind turbine in operation can be accurately done. Additionally, proper components change and timing of said changes can be performed. Furthermore, understanding the true loads allows to provide a better failure risk assessment, if combined with proper load to life analyses such as the present invention describes.

Accurate asset specific loads are a necessity for conducting new reliability analyses for already commissioned turbines, focusing on the long-term plan for asset actions, rather than the short-term traditional O&M.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

Figure 1:
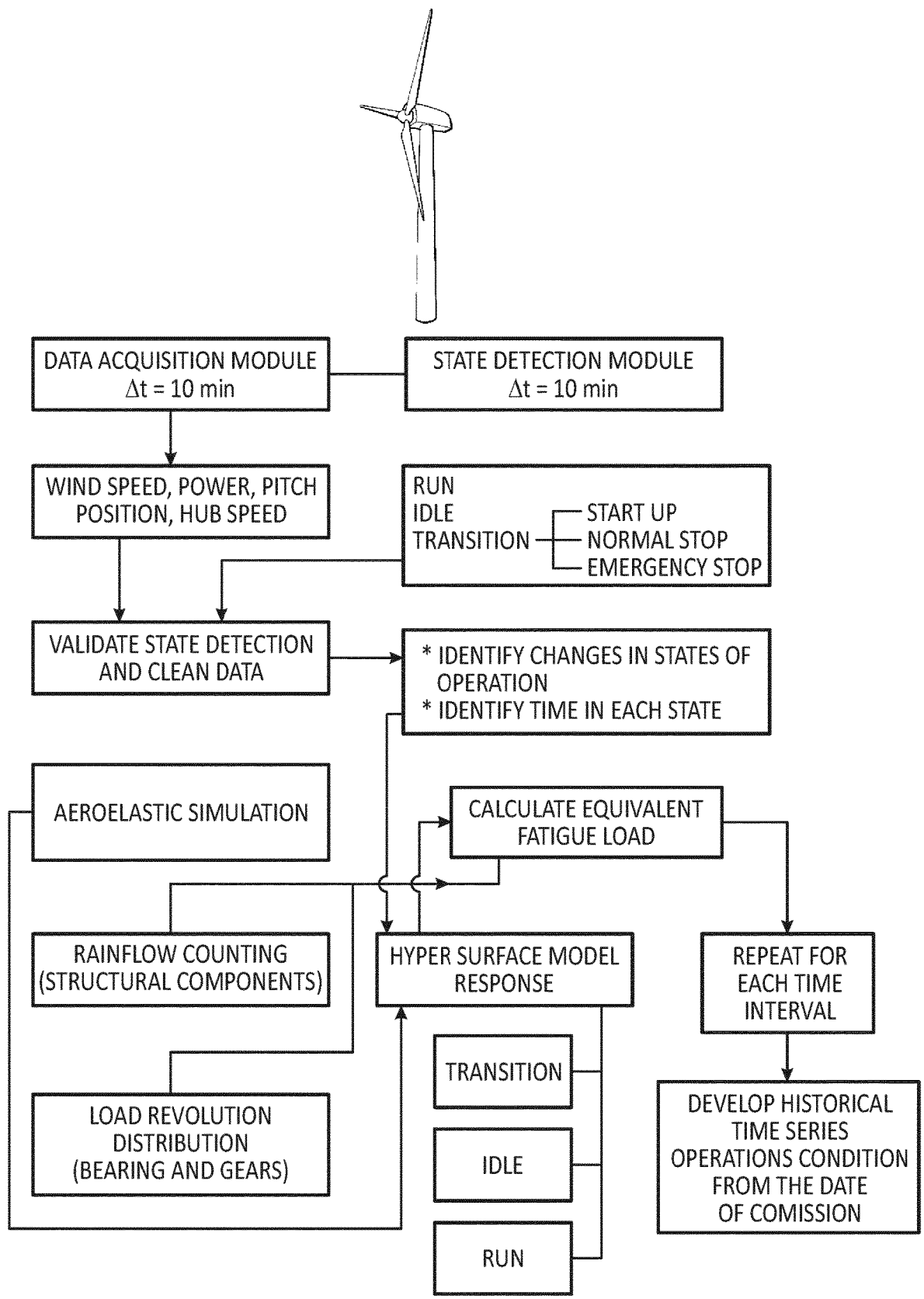
FIG. 1.—Shows a blocks diagram of a preferred embodiment of the method for estimating components life of a wind turbine.
Figure 2:
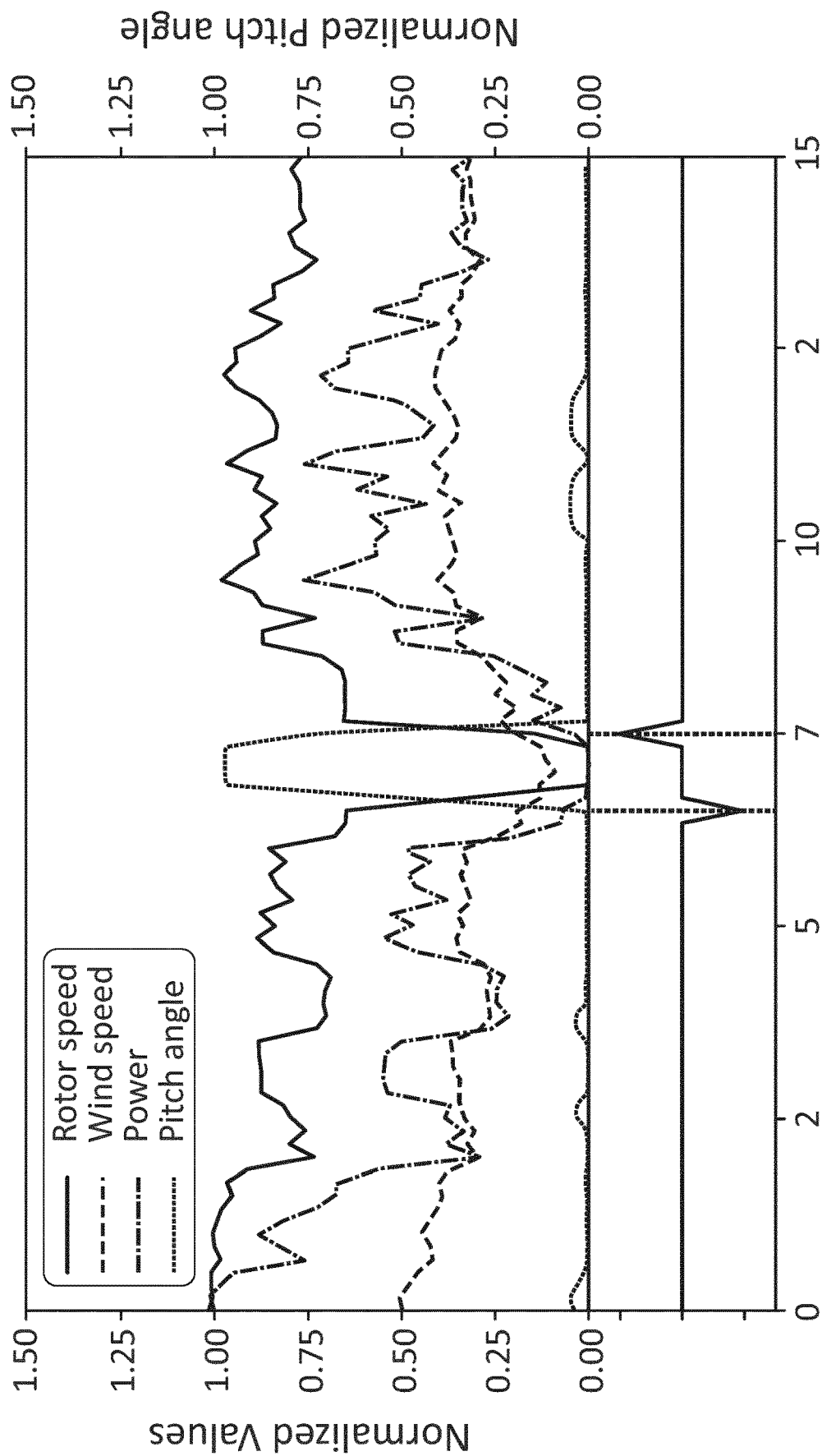
FIG. 2.—Shows an exemplary graphic of the data taken by the data acquisition module and an exemplary identification of a transition event by the data acquisition module.

FIG. 1 shows a blocks diagram of a preferred embodiment of the method herein disclosed. In the preferred embodiment described, a method for estimating remaining components life of an operational wind turbine comprises a data acquisition module comprising a SCADA conventional monitoring system configured to measure real historical data of said operational wind turbine and an additional state detection unit used to identify historical states of operation, wherein the method comprises extracting the historical data from the data acquisition module at time intervals of 10 min, said data comprising wind speed, power, pitch position and hub angular speed. FIG. 2 shows an exemplary representation of the data gathered by said data acquisition module. The following step of the method of FIG. 1 is to identify the operational states of the wind turbine by the state detection unit for each time interval of 10 min, said operational states comprising at least Run, Idle and Transition wherein Transition is further subcategorized in Startup, Normal Stop and Emergency Stop.

In the preferred embodiment described above, the state detection unit is a logical variable given by an internal control system of the operational wind turbine.

Furthermore, each operational State detected for each interval is validated with the data extracted from SCADA at each 10 min time interval and the uncertain or erroneous data is discarded.

The amount of times the wind turbine has changed states and the longest amount of time said wind turbine has spent on a given operational state during each time interval is detected and labeled for each time interval.

After these steps have been performed, hence actual and clean data for each time interval have being collected and states of operation and times of transitional events have been taken into account, an aeroelastic simulation model for each operational state identified and wind condition thereof should be performed for the specific turbine model to identify fatigue loads for each operational state, wind condition (velocity & turbulence intensity). In a preferred embodiment several hyper surface response models are performed for each wind condition and each operational state of the wind turbine model. Hence, actual occurring loads and duration thereof and transitional events are accurately identified based on simulation and/or hyper response surface model and the method for gathering the data disclosed herein.

This process is repeated for each time interval of the wind turbine from the date of commission.

Figure 3:
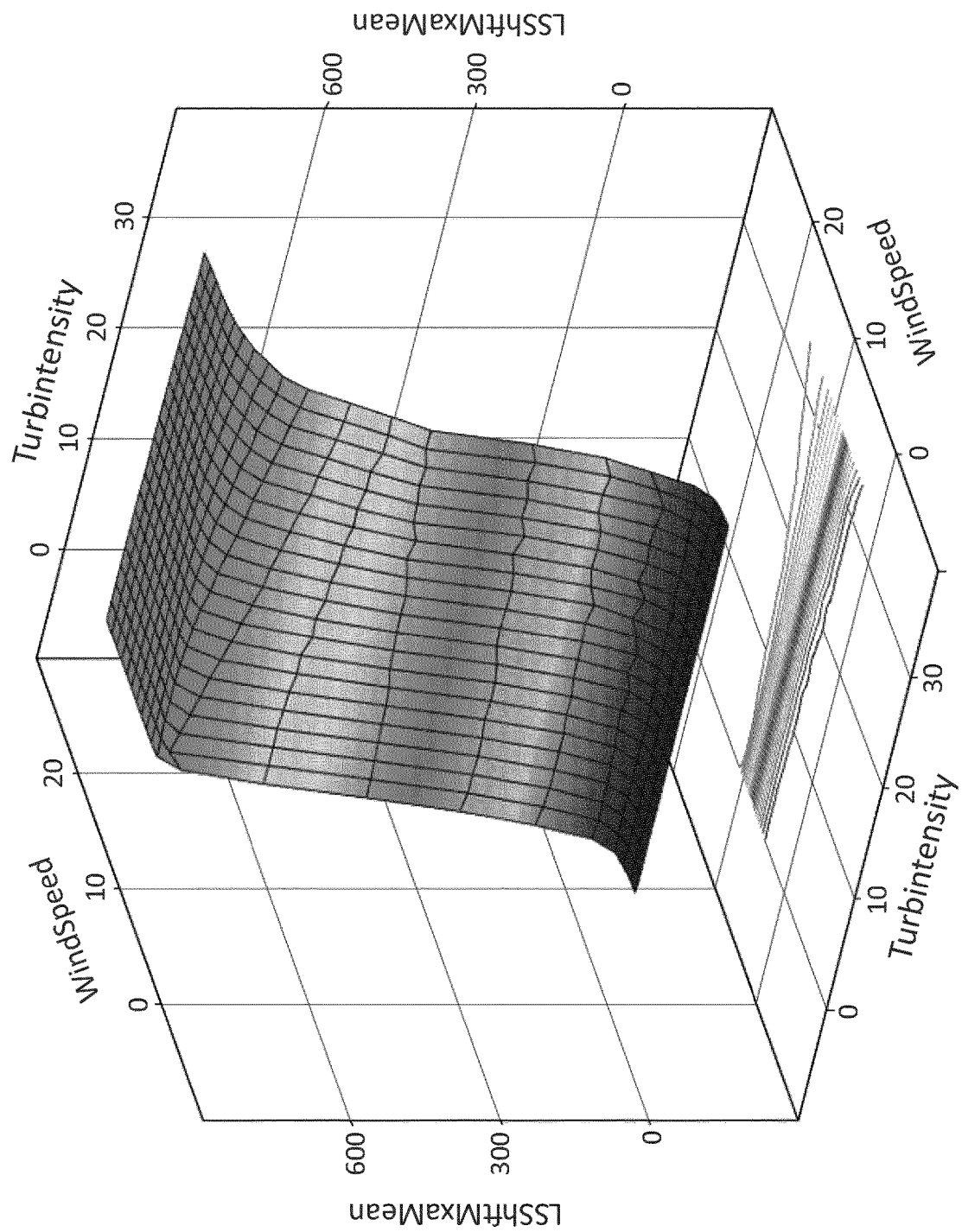
FIG. 3.—Shows an exemplary hyper dimensional response surface model that correlates actual historical wind conditions (wind speed & turbulence intensity) to fatigue equivalent angular moment at the low speed main shaft.

As FIG. 1 shows, in a preferred embodiment the method further comprises several hyper-dimensional response surface models that correlates wind and operational condition to a fatigue equivalent load for each operation state calculated in aeroelastic simulation. For example, FIG. 3 shows an exemplary representation of said hyper-dimensional response surface model that correlates wind speed and turbulence intensity to fatigue equivalent angular moment at the low speed main shaft for the operational state RUN.

As above mentioned, in a preferred embodiment the method comprises a calculation of a fatigue equivalent load for each operational state and each time interval and for each component of the wind turbine. Rain Flow Counting method is used for structural components and Load Revolution Distribution is used for all bearing and gear components. The loads are the results for each experiment at every time interval and it is an equivalent load that should infringe the same damage that the dynamic loads at each time interval.

Hence, an historical time-series comprising an average value of wind condition for each time interval and the corresponding fatigue equivalent load from date of commission is modelled.

Furthermore, a reliability analysis or remaining useful life is performed for each component of the wind turbine using the historical time operation condition time series and fatigue equivalent load at each interval.

A hyper-dimensional response surface model explores the relationship between several explanatory variables and one or more response variables. In this case the response surface model explores the fatigue equivalent loads to wind conditions. Various techniques exist to establish a response surface model based on a given set of executed experiment, such as Taylor Series, Radial Basis Function, and Kriging. This invention does not specify a technique to be used, but instead suggest that various techniques should be tested to identify the best representation for the correlation. The process of creating a response surface model should be repeated for all operational states (RUN, IDLE, TRANSITION) for the same or similar wind conditions.

The invention claimed is:

1. A method for estimating remaining useful life of components of an operational wind turbine model executed by computational elements, wherein said computational elements are communicatively coupled to the operational wind turbine which comprises a data acquisition module configured to measure real historical data of said operational wind turbine and an additional state detection unit to identify historical states of operation, wherein said method comprises:
   extracting historical data from the data acquisition module at a chosen time interval, said data comprising at least wind speed, blade pitch position and rotor speed;
   identifying operational states of the wind turbine using the state detection unit for each chosen time interval, said operational states comprising at least Run, Idle, and Transition which in turn comprises: Start up, Normal Stop, and Emergency Stop;

validating the identified operational states with the data extracted from the data acquisition module at each time interval, identifying and discarding uncertain data that do not match;

identifying a number of transitory events comprising the number of times the wind turbine has changed states, identifying a prevailing operational state comprising the state at which the longest amount of time said wind turbine has spent over the chosen time interval thereof;

identifying wind condition, said wind condition comprising at least mean wind speed and turbulence intensity at the chosen time interval;

repeat previous steps for multiple time intervals, wherein the method further comprises performing multiple simulations for the multiple time intervals chosen to estimate a fatigue equivalent load, said simulations consisting of obtaining the loads for the wind turbine model corresponding to wind condition for:
   the prevailing operational state identified and duration thereof at each time interval, and
   the transitory events identified at each time interval thereof.

2. The method for estimating remaining useful life of components according to claim 1, comprising several hyper dimensional response models each of said response models includes all fatigue loads for an operational state, a load component comprising forces and/or moments for a specific position of the wind turbine model.

3. The method for estimating remaining useful life of components according to claim 1, comprising multiple fatigue loads calculations at multiple time intervals from date of commission to estimate an historical time-series fatigue equivalent load for at least one load component comprising forces and/or moments for a specific position of the wind turbine model.

4. The method for estimating remaining useful life of components according to claim 1, further comprising a reliability analysis or remaining useful life for at least one component of the wind turbine using historical operation condition and fatigue equivalent load.

5. The method for estimating remaining useful life of components according to claim 1, wherein the simulation model is an aeroelastic simulation.

6. The method for estimating remaining useful life of components according to claim 1, wherein the state detection unit is a logical variable given by an internal control system of the operational wind turbine.

7. The method for estimating remaining useful life of components according to claim 1, wherein the data acquisition module comprises generator power data at each time interval.

8. The method for estimating remaining useful life of components according to claim 7, wherein the state detection unit is an independent code executed by computational elements which identify states of operation from the data acquisition module.

9. The method for estimating remaining components life according to claim 1, wherein the time interval is 10 min or smaller.

10. The method for estimating remaining components life according to claim 1, wherein the data acquisition module is a conventional Supervisory Control and Data Acquisition (SCADA) system of the wind turbine.

11. The method for estimating remaining components life according to claim 1, further comprising a measuring wind condition at each time interval from a nearby meteorological tower.

12. A system for estimating remaining useful life of components of an operational wind turbine model, comprising at least said wind turbine model which comprises a data acquisition module configured to measure real historical data of said operational wind turbine, a state detection unit to identify historical states of operation, wherein said system comprises:
   means for extracting historical data from the data acquisition module at a chosen time interval, said data comprising at least wind speed, blade pitch position, and rotor speed;
   means for identifying operational states of the wind turbine using the state detection unit for each chosen time interval, said operational states comprising at least Run, Idle and Transition States which in turn comprises: Start up, Normal Stop, and Emergency Stop;
   means for validating the identified operational states with the data extracted from the data acquisition module at each time interval, identifying and discarding uncertain data that do not match;
   means for identifying a number of transitory events comprising the number of times the wind turbine has changed states,
   means for identifying a prevailing operational state comprising the state at which the longest amount of time said wind turbine has spent over the chosen time interval;
   means for identifying wind condition, said wind condition comprising at least mean wind speed and turbulence intensity at the chosen time interval;
   means for repeating previous steps for multiple time intervals; and
   means for performing multiple simulations for the multiple time intervals to estimate a fatigue equivalent load, said simulations consisting of obtaining the loads for the wind turbine model corresponding to wind condition for:
      the prevailing operational state identified and duration thereof at each time interval, and
      the transitory events identified at each time interval thereof.

* * * * *